July 21, 1942.　　F. L. DALE ET AL　　2,290,801
DISPLAY DEVICE
Filed April 12, 1941　　5 Sheets-Sheet 1
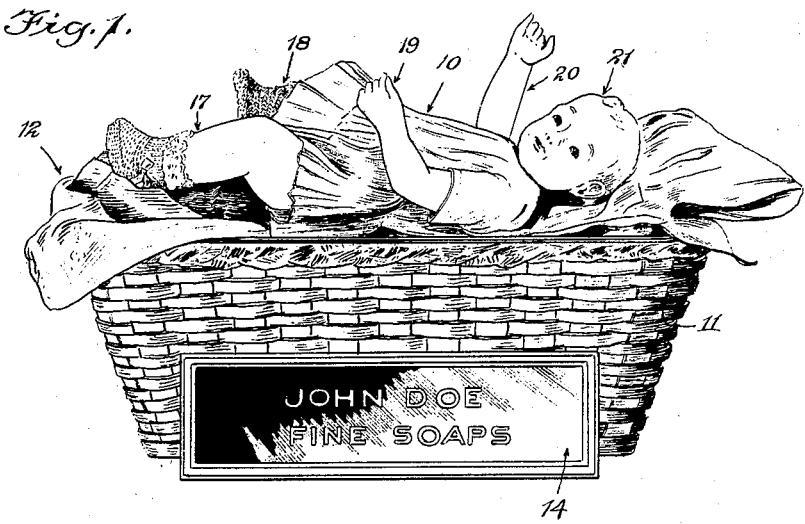
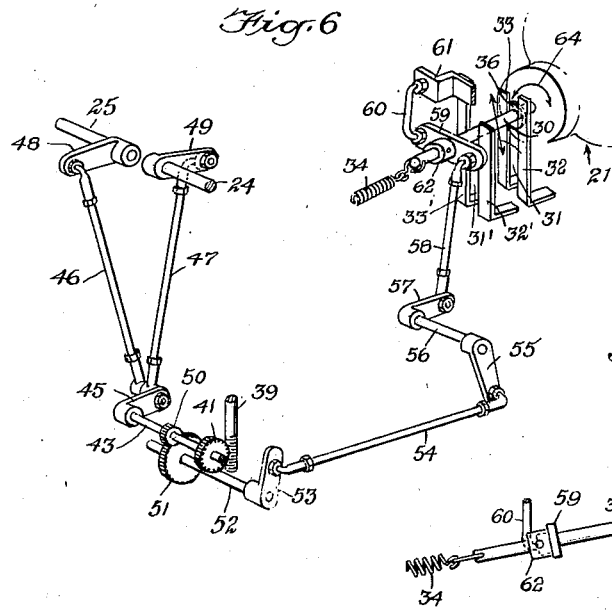

July 21, 1942.　　F. L. DALE ET AL　　2,290,801
DISPLAY DEVICE
Filed April 12, 1941　　5 Sheets-Sheet 2

WITNESSES

INVENTORS
Frank L. Dale
and Otto H. Seyesman
BY
ATTORNEYS

July 21, 1942.　　　F. L. DALE ET AL　　　2,290,801
DISPLAY DEVICE
Filed April 12, 1941　　　5 Sheets-Sheet 3

WITNESSES

INVENTORS
Frank L. Dale
and Otto H. Segesman
BY
ATTORNEY

July 21, 1942.   F. L. DALE ET AL   2,290,801
DISPLAY DEVICE
Filed April 12, 1941   5 Sheets-Sheet 4

WITNESSES

INVENTORS
Frank L. Dale
and Otto H. Segesman
BY
ATTORNEYS

July 21, 1942.   F. L. DALE ET AL   2,290,801
DISPLAY DEVICE
Filed April 12, 1941   5 Sheets-Sheet 5

WITNESSES
Geo. W. Naylor

INVENTORS
Frank L. Dale
and Otto H. Segesman
BY
Munn, Anderson & Liddy
ATTORNEYS Patented July 21, 1942

2,290,801

UNITED STATES PATENT OFFICE 2,290,801

DISPLAY DEVICE

Frank L. Dale, New York, N. Y., and Otto H. Segesman, Canton, Ohio, assignors to Mechanical Man, Inc., New York, N. Y., a corporation of New York Application April 12, 1941, Serial No. 388,254

6 Claims. (Cl. 46—120)

This invention relates to an improved animated figure.

A particular object of the invention is the provision of an improved animated figure having the appearance of a baby and which simulates in lifelike manner many of the movements of a baby.

A further object of the invention is an improved aminated figure which attracts attention because of its life-like apearance and movements and for that reason is well suited to be used for advertising and display purposes.

Among other objects is the provision of an improved figure of the above character in which the head, arms and legs move in a natural manner and in which improved operating mechanism is provided to cause the aforesaid natural movements.

Other objects of the invention will be apparent from the following detailed description of our invention in which—

Fig. 1 is a side elevation of an animated figure embodying our invention in the form of a baby lying in a small basket or bassinet;

Fig. 6 is a detailed view of a portion of the mechanism for operating the legs and head;

Fig. 7 is a detailed side elevation of a portion of the mechanism for supporting and operating the head of the figure;

Figure 2:
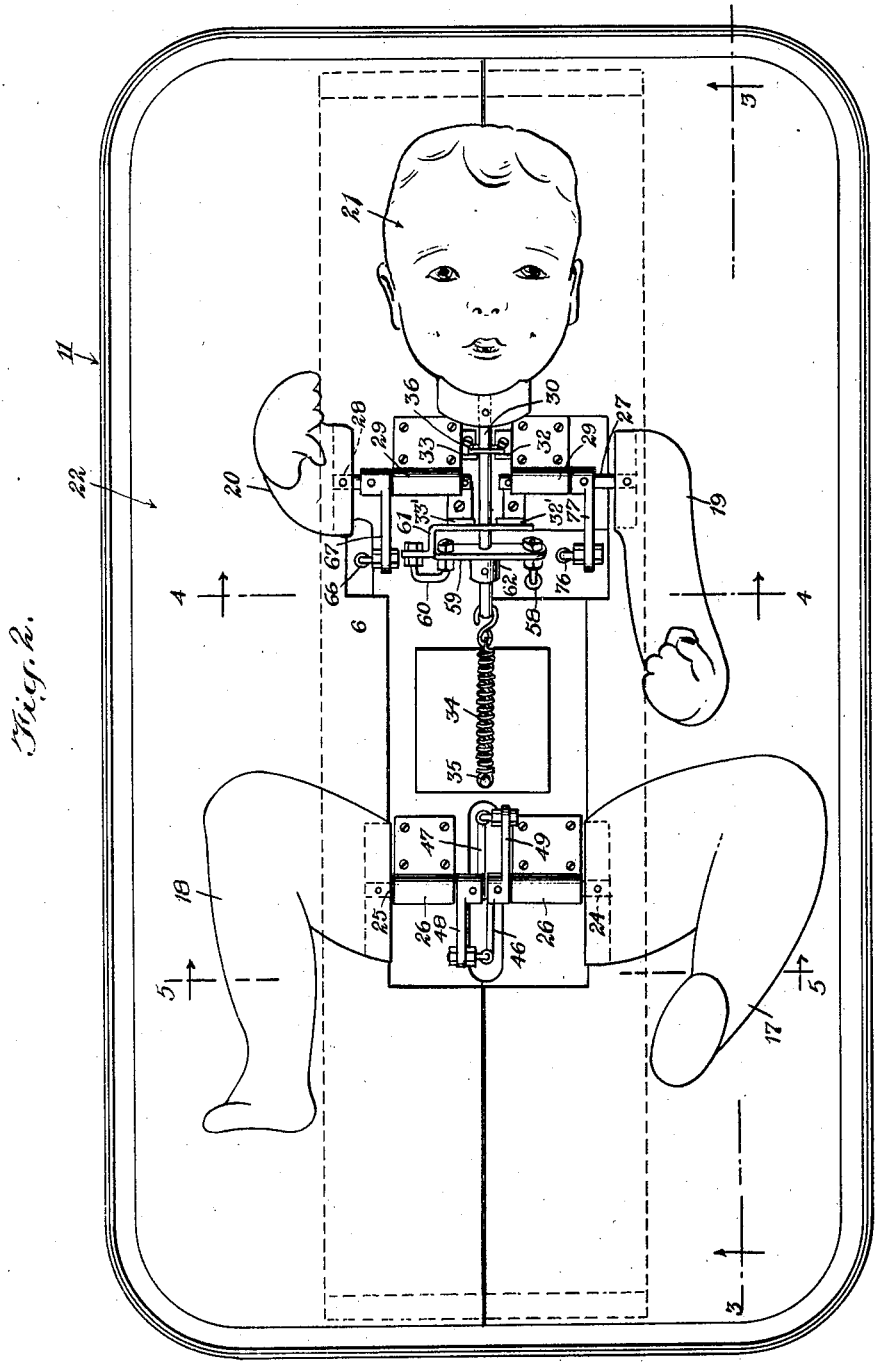
Fig. 2 is a top plan view of the figure with the body portion or trunk removed so as to reveal the operating mechanism.

In the illustrated embodiment of our invention we provide a figure 10 simulating a baby in appearance and disposed on a stand 11 which is made to resemble a basket or bassinet. Blankets and bedding 12 may be placed in the basket and baby clothes may be placed on the figure as shown to give it a natural life-like appearance. Suitable advertising or display matter may be used in connection with the device as for instance the transparent advertising sign 14 illuminated from inside of the basket by the electric lights 15.

The illustrated figure comprises a body or trunk portion 16, legs 17 and 18, arms 19 and 20, and a head 21, the arms, legs and head being formed so as to be movable in a predetermined manner with respect to the body portion. The figure is preferably supported on a frame comprising a horizontal member 22' having a covering 22 and uprights 23, all of which may be concealed within the basket. The body portion 16 of the figure rests on the frame and is preferably hollow so as to accommodate the mechanism employed for moving the hands, arms and head in a life-like manner.

The legs, arms and head may be supported in many different manners so as to be movable with respect to the body. However, we prefer to support them in the manner shown in the accompanying drawings in which the legs 17 and 18 are mounted on shafts 24 and 25 which are journaled in brackets 26 mounted on the frame. The arms 19 and 20 are mounted on shafts 27 and 28 which are journaled in brackets 29 mounted on the frame. The head 21 is supported on a shaft 30 which extends through slots 31 and 31' formed between the uprights 32 and 33 and 32' and 33' which in turn are mounted on the frame. The shaft 30 is connected at its end to a spring 34 which is under tension and is attached to a fixed support 35 on the frame. The spring 34 exerts tension against the head and tends to impart a life-like appearance to the movement thereof. Movement of the head inwardly beyond a predetermined point under the tension of the spring is prevented by a collar 36 formed around shaft 30 and held in position by a pin passing through the shaft. The collar 36 engages the uprights 32 and 33 and serves as a fulcrum point for shaft 30 in the tilting movements of head 21. Due to the construction just described it will be appreciated that the legs, arms, and head can be moved through the medium of shafts 24, 25, 27, 28 and 30.

Different types of operating devices may be provided to cause movement of the several parts. However, I prefer to provide a motor such as the electric motor 37 for controlling the movement of the legs and head and a motor such as the electric motor 38 for controlling the movements of the arms. The motors 37 and 38 are preferably provided with speed reduction drives such as worms 39 and 40, meshing with gears 41 and 42, mounted on shafts 43 and 44 respectively.

On the end of shaft 43 is mounted a crank 45 connected by links 46 and 47 to cranks 48 and 49 attached to the ends of shaft 25 and 24 respectively. The cranks 48 and 49 are somewhat longer than the crank 45 with the result that when motor 37 operates so as to cause rotation of shaft 43 and of crank 45 the cranks 48 and 49 are caused to reciprocate upwardly and downwardly with the result that the legs 17 and 18 move backward and forward in simulated kicking motions. We have found that a more life-like appearance is given to the motion if the legs are caused to kick in opposite directions and to accomplish this result the cranks 48 and 49 are disposed in substantially opposite relationship as shown in Figs. 3 and 6.

The motor 37 also causes head 21 to turn and to tilt slightly in a life-like manner and this motion is caused by means of a small pinion 50, mounted on shaft 43 which meshes with a larger pinion 51 mounted on shaft 52 and formed with a crank 53 at the end thereof which is connected by means of link 54 to a larger crank 55 disposed at the end of shaft 56. The shaft 56 has mounted on the opposite end thereof a crank 57 which is connected by link 58 to link 59 pivotally connected at its opposite end to link 60 which in turn depends downwardly from and is pivotally connected to the member 61 supported on the upper end of the upright 33'. Link 59 is formed with an aperture at approximately the center thereof through which the head supporting shaft 30 projects and the shaft 30 is fixedly connected to link 59 by means of collar 62. Thus it will be seen that upon the operation of motor 37 shaft 52 is caused to rotate which causes a reciprocation of link 54 and an oscillating movement of shaft 56. The oscillation of shaft 56 in turn causes a reciprocation of link 58 causing the end of link 59 which is connected thereto to move up and down as indicated by the arrow 63. This motion causes shaft 30 to move up and down and at the same time to oscillate back and forth in the manner indicated by arrow 64. The shifting of shaft 30 is guided by the slots 31 and 31' and the shaft fulcrums at the point of engagement between collar 36 and uprights 32 and 33. Thus the operation of motor 37 causes the head 21 of the figure to turn back and forth and at the same time to tilt slightly in a life-like manner.

Figure 3:
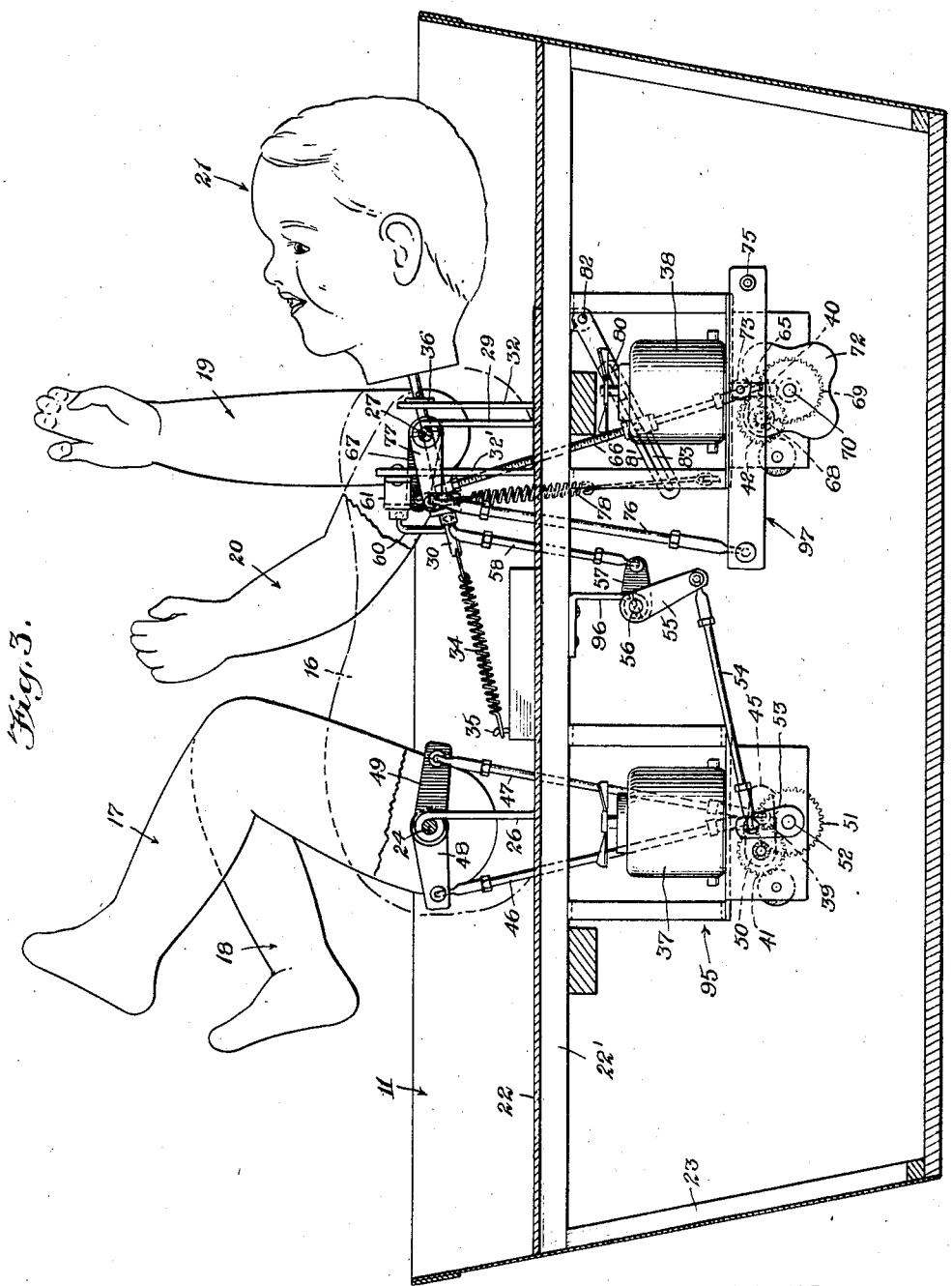
Fig. 3 is a longitudinal sectional view in the direction of the arrows on the line 3—3 of Fig. 2.
Figure 4:
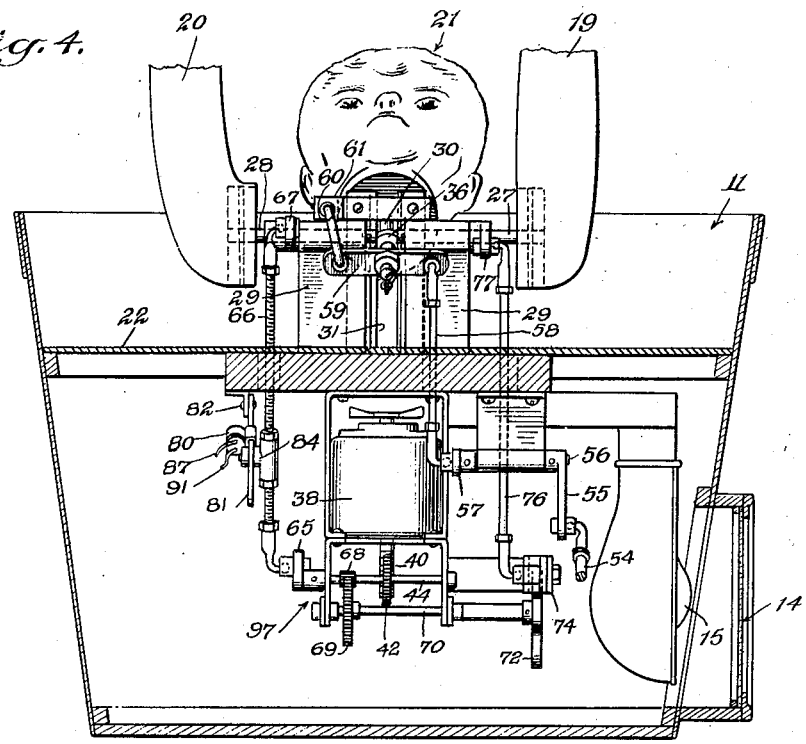
Fig. 4 is a cross-sectional view in the direction of the arrows on the line 4—4 of Fig. 2.
Figure 5:
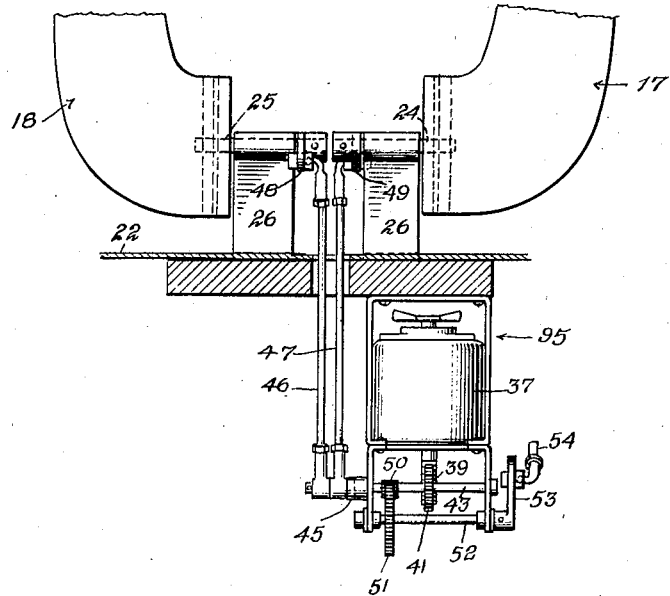
Fig. 5 is a cross sectional view in the direction of the arrows on the line 5—5 of Fig. 2.
Figure 8:
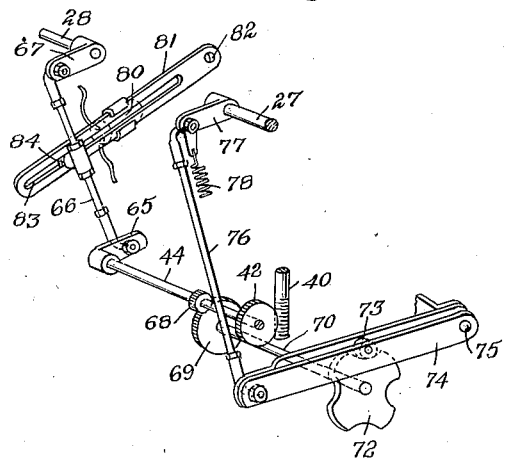
Fig. 8 is a detailed perspective view of a portion of the mechanism for operating the arms of the figure and showing the switch for controlling the circuit of the motor which operates the legs and head.

The mechanism for causing the operation of the arms is shown most clearly in Figs. 3, 4 and 8. It will be seen that shaft 44 has mounted on the end thereof a crank 64 which is connected by means of link 66 to a somewhat larger crank 67 mounted on the end of arm shaft 28. Operation of the motor causes rotation of shaft 44 and reciprocation of link 66 which in turn results in the oscillation of shaft 28. Thus arm 20 is caused to move up and down through an arc.

A somewhat different arrangement is preferably used to cause the operation of arm 19 so as to cause a different relationship in the motion of the two arms. For this purpose we preferably provide a small pinion 68 on shaft 44 which meshes with a larger pinion 69 mounted on shaft 70 which has a cam 72 formed on the end thereof. Cam 72 is engaged by a small follower 73 carried adjacent the central portion of the lever arm 74 which in turn is pivotally mounted at one end 75 to the supporting frame and is pivotally connected at its opposite end to the link 76. Link 76 is in turn pivoted to the end of crank 77 mounted on the end of arm shaft 27. The surface of cam 72 is preferably formed with a plurality of dwell portions such as the four dwell portions shown in the drawings so that lever 74 is caused to reciprocate a plurality of times during each rotation of the shaft. By positive action the cam will cause the follower 73, lever 74, link 76 and crank 77 to shift upwardly. Normally gravity might be sufficient to cause the parts to return downwardly. However, to insure engagement between the follower and the cam and to insure the return of the parts to their lowermost position we preferably provide a spring 78 connected between the end of crank 77 and the supporting frame. Thus it will be seen that upon the operation of the motor, shaft 70 and cam 72 are caused to rotate with the result that lever 74, link 76 and crank 77 are caused to reciprocate upwardly and downwardly and shaft 27 is caused to oscillate which results in a short back and forth movement of arm 19.

We have found that a more life-like effect is imparted to the figure if at least some of the movements are intermittent or hesitant in character and we accordingly provide automatic mechanism for causing an interruption of the current of one of the motor circuits to accomplish the intermittent or hesitant action. For this purpose we prefer to temporarily interrupt the circuit of motor 37 which will result in an intermittent or hesitant motion of legs 17 and 18 and of head 21. To accomplish this result we preferably provide a mercury switch 80 supported on lever arm 81 which is pivotally mounted as at 82 on the frame. Lever arm 81 is provided with a slot 83 which is engaged by a slide 84 adjustably mounted on link 66. The mercury switch is provided with two contacts 85 and 86 disposed in vertically spaced relationship, one above the other. When the switch is in the horizontal position shown in dotted lines in Fig. 9 the circuit is interrupted. When the switch is inclined downwardly as shown in full lines the mercury completes the circuit between the two contact points. It will thus be seen that the slide 84 may be adjusted on link 66 so as to cause an interruption of the circuit in switch 80 once during each cycle of operation of motor 38. As the operation of motor 38 continues causing lever arm 81 to pivot downwardly the circuit is again completed.

Figure 9:
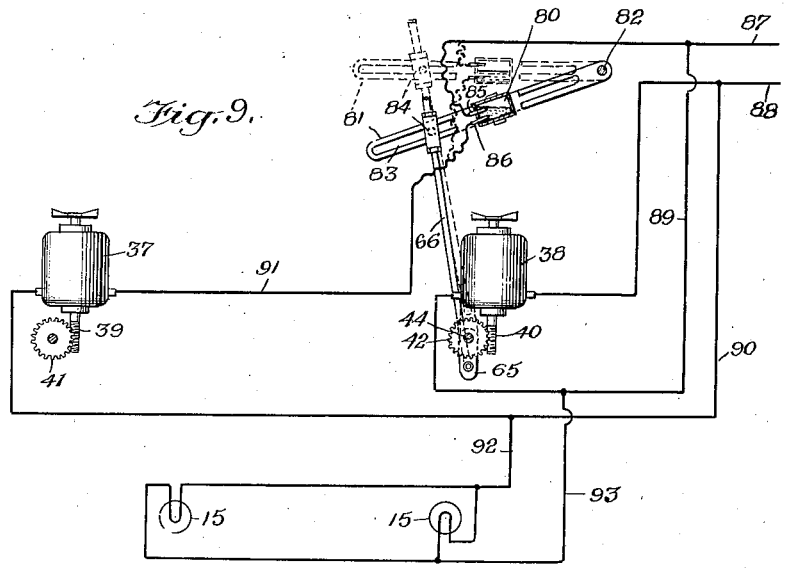
Fig. 9 is a diagram showing the electrical circuits of the motor operating the arms, legs and head of the figure.

Since, as will be seen by reference in Fig. 9 the switch 80 is connected in the circuit of motor 37 it will be appreciated that the operation of motor 37 is interrupted for a predetermined period once during each complete cycle of operation of the motor 38. The circuits of the motor may be arranged as shown in Fig. 9. Thus we provide a pair of lead wires 87 and 88 which may be connected to a suitable source of electric current. The lead 88 is directly connected to one terminal of motor 38 and the lead 87 is connected by lead 89, the other terminal of motor 38. Lead 88 is also connected by a lead 90 to one of the terminals of motor 37, the other terminal of motor 37 being connected by lead 91 to contact 86 of the mercury switch the other contact of the mercury switch being connected directly to lead 87. The lights 15 may be energized from the same source of electric current by means of leads 92 and 93 connected to the leads 89 and 90. A suitable manually operated switch may of course be provided to control the respective circuits.

When our improved animated figure is constructed in the manner shown and the circuits of the respective motors are energized it will be seen that motor 37 causes the legs 17 and 18 to kick in opposite directions and causes head 21 to turn and to nod or tilt slightly in a life-like manner. Simultaneously motor 38 causes arm 20 to shift upwardly and downwardly and causes arm 19 to move back and forth through a short arc. Once during each cycle of operation of motor 38 the circuit of motor 37 is interrupted through the medium of mercury switch 80 thereby causing a hesitant or intermitten motion of the legs and head giving a more realistic or natural appearance to the figure. The length of time of the interruption may be varied and controlled by adjusting the position of slide 84 on link 66. By shifting the slide downwardly the period of interruption will be shorter and by shifting the slide upwardly the period of interruption will be longer.

Motors 37 and 38 and shafts 43, 52, 56, 44 and 20 are supported by brackets 95, 96 and 97, all carried by the frame in the manner shown.

The structure which we provide for supporting the head 21 including the shaft 30, the spring 34, the collar 36, and the uprights 32 and 33 aid in giving a life-like appearance to the nodding or tilting movement of the head. Of course it will be appreciated that many modifications may be made in the illustrated and described embodiment of our invention such as eliminating the illuminated advertising sign 14. While we have illustrated and described the preferred embodiment of our invention we intend to protect all modifications and embodiments thereof coming within the scope of the appended claims.

We claim:

1. An animated display device comprising a simulated figure of a baby having a trunk portion and head, arm and leg members mounted on the trunk portion so as to be movable with respect thereto, means including an electric motor for causing the head and legs to move with respect to the trunk portion, means including a second motor for causing the arms to move with respect to the trunk portion, and a switch controlling the circuit of the first-mentioned motor and operatively connected to the second-mentioned motor so as to cause a periodic interruption of the circuit of the first-mentioned motor whereby an intermittent or hesitant motion is imparted to the legs and head.

2. An animated display device of the type set forth in claim 1 in which the switch is a mercury switch mounted on an arm operatively connected to the second-mentioned motor so as to be shifted thereby between a position in which the mercury completes the circuit and a position where the mercury interrupts the circuit.

3. An animated display device comprising a simulated figure of a baby having a trunk portion, a head mounted on the trunk portion so that it can turn with respect thereto, a pair of arms mounted on the trunk portion so that they can shift through arcs extending generally longitudinally of the figure, a pair of legs mounted on the trunk portion so that they can shift in a simulated kicking motion with respect to the trunk portion, means including a first electric motor operatively connected to the head and legs for causing the head to turn and for causing the legs to kick in opposite directions with respect to each other, means including a second electric motor operatively connected to the arms to cause them to simultaneously move through arcs generally longitudinally of the figure, a switch for controlling the circuit of the first-mentioned motor, and means operatively connected to the second-mentioned motor and controlling the operation of the switch so as to cause a periodic interruption of the circuit of the first-mentioned motor whereby an intermittent or hesitant motion is imparted to the legs and head.

4. An animated display device comprising a simulated figure having a trunk portion, and a pair of arms mounted on and shiftable with respect to the trunk portion through arcs extending substantially longitudinally of the figure and means for causing one of said arms to describe a relatively long arc with respect to the trunk portion and for causing the other arms to describe a relatively short arc with respect to the trunk portion, said means comprising a motor, a crank operatively connected to the motor so as to be driven thereby, a second crank arm relatively longer than the first-mentioned crank arm and connected to one of the arms, and a link connected between the two crank arms, and a rotary cam having a plurality of dwell portions operatively connected to the motor so as to be driven thereby, a follower having means for holding it in engagement with the cam, and means operatively connecting the follower with the other arm.

5. An animated display device comprising a simulated figure, having a trunk portion, a head, means for mounting the head on the trunk portion so that it is shiftable with respect thereto, and operating means for causing the head to simultaneously turn and tilt with respect to the trunk portion, the mounting for the head comprising a shaft attached at one end to the head and connected at the other end to a spring which is under tension and connected to a support fixed with respect to the trunk portion said shaft having engagement intermediate its ends with a member fixed with respect to the trunk portion which serves as a fulcrum point, and the operating means comprising a motor, a member operatively connected to the motor so as to be reciprocated thereby, a link pivotally mounted with respect to the trunk portion adjacent one end and connected to the reciprocating member adjacent the other end and having engagement with the shaft supporting the head on the spring side of the fulcrum whereby reciprocation of the member causes the shaft to rotate and also to pivot on the fulcrum point.

6. An animated display device comprising a figure having a trunk portion, a pair of leg members attached to the trunk portion and shiftable with respect to the trunk portion in a simulated kicking motion, and operating means for causing the legs to simultaneously move in opposite directions, said means comprising a motor, a shaft driven by the motor and having a crank arm mounted thereon, a crank arm connected to each of the legs, and links connected between the first-mentioned crank arm and the crank arms connected to the legs, the crank arms connected to the legs being relatively longer than the first-mentioned crank arm and being disposed in substantially opposite relationship with respect to each other.

FRANK L. DALE.
OTTO H. SEGESMAN.